United States Patent
Chambers et al.

(10) Patent No.: US 7,315,238 B2
(45) Date of Patent: Jan. 1, 2008

(54) METHOD AND SYSTEM FOR PROVIDING KEY PROGRAMMING TOKENS TO A MULTIPLE VEHICLE PROGRAMMING DEVICE

(75) Inventors: Greg Chambers, Nuneaton (GB); Karmjit Kalsi, Coventry (GB)

(73) Assignee: Advanced Diagnostics USA Corporation, South San Francisco, CA (US)

( * ) Notice: Subject to any disclaimer, the term of this patent is extended or adjusted under 35 U.S.C. 154(b) by 91 days.

(21) Appl. No.: 10/897,573

(22) Filed: Jul. 22, 2004

(65) Prior Publication Data

US 2006/0021015 A1  Jan. 26, 2006

(51) Int. Cl.
*B60R 25/10* (2006.01)

(52) U.S. Cl. .................. 340/426.35; 340/426.14; 340/426.13; 340/825.69; 340/825.72; 340/539.1; 340/539.32

(58) Field of Classification Search ........... 340/426.14, 340/426.35, 426.13, 3.1, 825.69, 825.72, 340/539.1, 539.32
See application file for complete search history.

(56) References Cited

U.S. PATENT DOCUMENTS

| | | | |
|---|---|---|---|
| 6,392,534 B1 * | 5/2002 | Flick | 340/426.17 |
| 6,480,117 B1 * | 11/2002 | Flick | 340/825.69 |
| 6,484,164 B1 * | 11/2002 | Nikolovska et al. | 707/3 |
| 7,010,402 B2 * | 3/2006 | Flick | 701/36 |
| 7,023,360 B2 * | 4/2006 | Staniszewski | 340/932.2 |

* cited by examiner

*Primary Examiner*—Daryl C Pope
(74) *Attorney, Agent, or Firm*—Vierra Magen Marcus & DeNiro LLP (57) ABSTRACT

A method and system of providing tokens to allow a multiple vehicle programmer to program vehicle transponder keys. A token server collects payment for the number of tokens purchased and creates a token update file. The token update file loads the purchased tokens into the multiple vehicle programmer. To program a vehicle transponder key the multiple vehicle programmer checks for an unused token, if available, the unused token authorizes the programming of the vehicle programmer key. The multiple vehicle programmer marks the token as used after successfully programming the transponder key.

20 Claims, 9 Drawing Sheets

METHOD AND SYSTEM FOR PROVIDING KEY PROGRAMMING TOKENS TO A MULTIPLE VEHICLE PROGRAMMING DEVICE

BACKGROUND

1. Field of the Invention

The present invention relates, generally, to the programming of keys. More particularly, the present invention relates to the programming of keys for automobiles.

2. Related Background

Automotive security systems have evolved to include electronically programmed transponder keys on many models of automobiles. To start a car with an electronic transponder key system a key having the proper code must be inserted into the ignition. If the electronic transponder key does not provide the appropriate signal, based upon the electronic code programmed into the key, the automobile's security system will not authorize starting the automobile, and the ignition will not work.

As keys can be lost, destroyed or stolen, or may become inoperable, car dealerships and specialized locksmiths provide a service of programming a new transponder key to work with a given vehicle.

Programming of transponder keys is typically done with a multiple vehicle programmer (MVP), which is typically a handheld electronic device capable of interfacing with the vehicle's security system, reading electronic values from the car's computer system, and programming an electronic key based upon the values read out from the vehicle's computer. An example of a conventional MVP is the AD100 sold by Advanced Diagnostics U.K. MVPs like the AD100 allow a locksmith to program keys for a variety of vehicles. As is typical of MVPs, the AD100 includes a keypad and display screen, as well as connection ports for connecting to either a car's computer or a PC or other computer. The AD100 also includes and RF antenna to be able to communicate with transponder keys. A locksmith can connect the MVP to the serial port of an automobiles computer security system. The locksmith can use the MVP to read fault codes, clear fault codes, display data received from the automobile's computer, read mechanical key codes, read electronic transponder key codes, identify the automobile's electronic control using (ECU), clear key memories, and program new keys.

Many MVPs provide for software updates to be downloaded to the MVP. In addition to bug fixes or similar patches or updates, updates also can provide enhanced functionality. For example, if a new model of car or a new transponder system is introduced into the market updates are made available which, once downloaded and installed, allows the MVP to program transponder keys to work with the new model of car or a new transponder system.

Additional updates, which allow a greater range of types of keys or greater range of types of vehicles or transponder systems, are provided at an additional cost. While the updates are provided at an additional cost, this merely expands the types of systems the MVP may program, but does not change the unlimited number of keys which may be programmed with conventional MVPs.

While MVPs allow locksmiths to program keys, they are expensive to the point where many locksmiths find them prohibitively expensive. As the MVP can program an unlimited number of keys, it is sold with a high cost, often in the form of a high license for the software to program keys.

Some MVPs are also capable of programming other automotive security systems other than transponder keys. For example, the programming of remote fobs—used to open or unlock cars without using the key, or other functions, may also be performed with an MVP. Similarly, the programming of door keypads, as found on some models of Ford vehicles, may also be performed with an MVP.

Accordingly, the present invention seeks to overcome these and other disadvantages and limitations in conventional key programming systems and devices.

SUMMARY

The present invention provides a system and method for programming keys and other security devices. A MVP for programming keys uses a permissive token system to authorize the programming of a key, such as a transponder key. To program a transponder key the MVP checks to see if there are unused tokens stored within the memory of the MVP. If an unused token is stored in the memory of the MVP, the MVP will authorize the programming of a transponder key. When the MVP receives confirmation that the transponder key has been successfully programmed (or reprogrammed) the MVP erases one token from the MVP's memory. The tokens are stored in a secure area of the MVP's memory, such that only the MVP's token management software may load or erase tokens.

To allow additional keys to be programmed, additional tokens may be purchased and downloaded to the MVP. The MVP may be communicatively coupled to a token server. The token server establishes a secure handshake with the MVP, authenticating the MVP and preparing the MVP to receive additional tokens. Once the secure handshake is established tokens may be downloaded into the secure memory of the MVP. Once the MVP is decoupled from the token server, and the secure handshake is interrupted, the MVP reverts back to its previous secure state where tokens may no longer be downloaded to it.

DETAILED DESCRIPTION

The present invention is described in the context of a specific embodiment. This is done to facilitate the understanding of the features and principles of the present invention and the present invention is not limited to this embodiment. In particular, the present invention is described in the context of programming transponder keys for motor vehicles. The terms car, automobile, vehicle and motor vehicle are, unless specifically noted to the contrary, used interchangeably within the present application.

In the following figures like objects are provided with the same identifying number as an aid in understanding the present invention.

Multiple Vehicle Programmer and Token System

Figure 1:
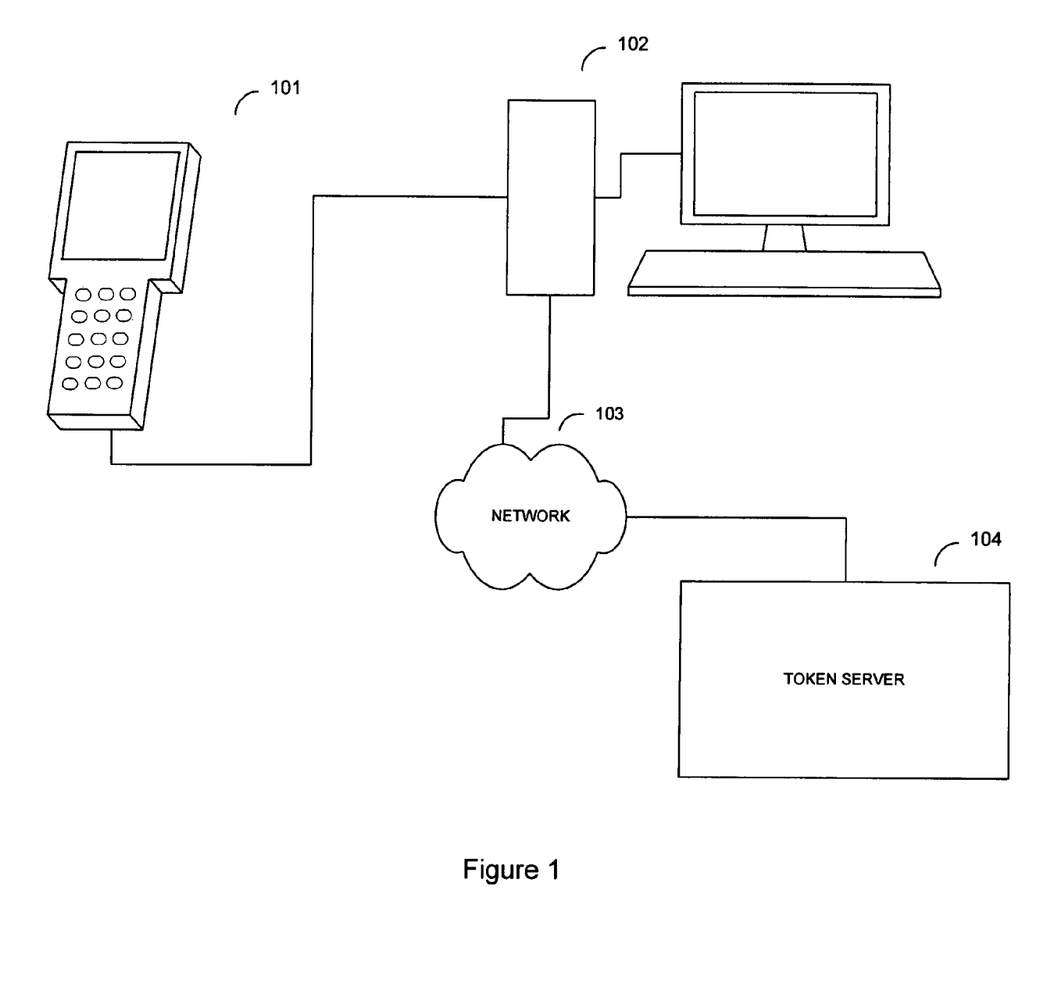
FIG. 1 is generalized block diagram of a vehicle programming and computer system that may be used to implement the present invention.

FIG. 1 illustrates a generalized system used to implement the present invention. A multiple vehicle programmer (MVP) 101 is used to program electronic keys, specifically electronic transponder keys. The MVP communicatively couples to a computer 102. In the presently preferred embodiment, the MVP communicatively couples to the computer by a standard wired connection, such as USB, serial or parallel port connection. Alternatively, the MVP could communicatively couple to the computer by a wireless system such as WiFi, Bluetooth, or any other such wireless protocol or wired connection. In the presently preferred embodiment, the computer 102 is a standard desktop computer, such as a PC, but other types of computers including server, laptop, MAC, handhelds or mobile phones could be used in alternate embodiments.

The computer 102 connects to a communication network 103. In the presently preferred embodiment the communications network is the Internet. A token server 104 is communicatively connected to the communications network 103.

While the presently preferred embodiment has the MVP communicatively coupling to the token server through a computer, alternate embodiments could have the MVP communicatively couple with the token server either directly or through other electronic or communication devices.

Figure 2:
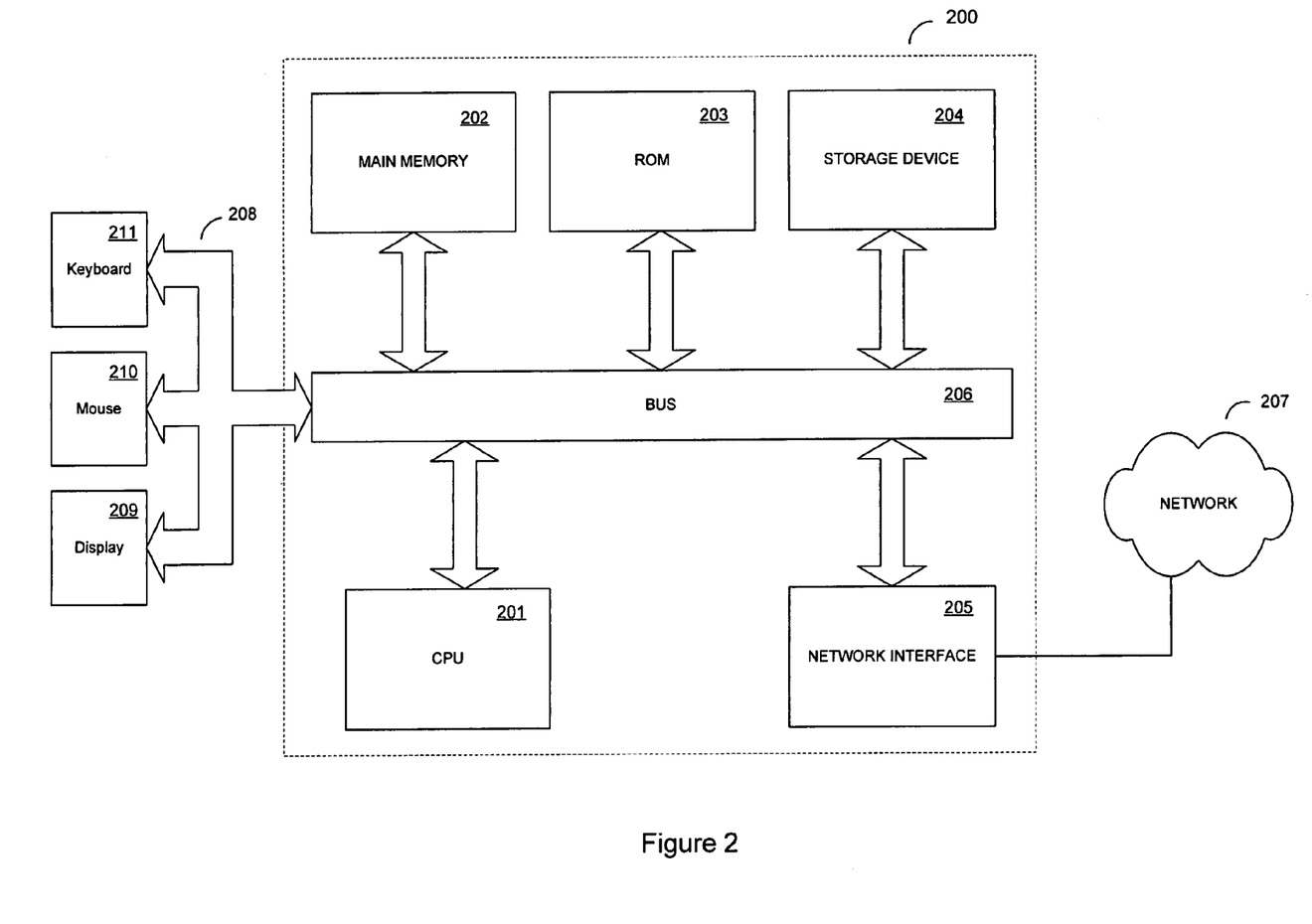
FIG. 2 is a generalized block diagram of a server computer that may be used to implement the present invention.

FIG. 2 is a generalized block diagram of a server computer 200 including a central processing unit (CPU) 201, main memory (typically RAM) 202, read-only memory (ROM) 203, a storage device (typically a hard drive) 204, and a network device (typically a network interface card, a.k.a. NIC) 205. The server includes a bus 206 or other communication mechanism for communicating information between the CPU 201 coupled with bus 206 and other components of the server computer. The CPU 201 is used for processing instructions and data. The main memory 202, ROM 203 and storage device 204 are coupled to bus 206 and store information and instructions to be executed by processor 201. Main memory 202 also may be used for storing temporary variables or other intermediate information during execution of instructions to be executed by processor 201. The network device 205 connects the server computer to a communications network 207.

Server 200 may be coupled via bus 208 to a display 209, such as a cathode ray tube (CRT) or flat panel monitor, for displaying information to a computer user. An input device 210, such as a keyboard, is coupled to bus 208 for entering information and instructions to the server 200. Additionally, a user input device 211 such as a mouse, a trackball, or cursor direction keys for communicating direction information and command selections to the processor 201 and for controlling cursor movement on the display 209 may be used with the server 200.

The token server is similar in general architecture to the database server and personal computer.

The server 200 is designed to run programs implementing methods, such as the methods of the present invention. Typically such programs are stored on the hard drive of the server, and instructions and data of the program are loaded into the RAM during operation of the program. Alternate embodiments of the present invention could have the program loaded into ROM memory, loaded exclusively into RAM memory, or could be hard wired as part of the design of the server. Accordingly, programs implementing the methods of the present invention could be stored on any computer readable medium coupled to the server. The present invention is not limited to any specific combination of hardware circuitry and software, and embodiments of the present invention may be implemented on many different combinations of hardware and software.

As used within the present application, the term "computer-readable medium" refers to any medium that participates in providing instructions to CPU 201 for execution. Such a medium may take many forms including, but not limited to, non-volatile media, volatile media, and transmission media. Examples of non-volatile media include, for example, optical or magnetic disks, such as storage device 204. Examples of volatile media include dynamic memory, such as main memory 202. Additional examples of computer-readable media include, for example, floppy disks, hard drive disks, magnetic tape, or any other magnetic medium, a CD-ROM, any other optical medium, punchcards or any other physical medium with patterns of holes, a RAM, a PROM, and EPROM, a FLASH-EPROM, any other memory chip, stick or cartridge, a carrier wave as described hereinafter, or any other medium from which a computer can read. Transmission media includes coaxial cables, copper wire and fiber optics, including the wires that comprise bus 206 and 208. Transmission media can also take the form of acoustic, electromagnetic or light waves, such as those generated during radio-wave and infra-red data communications.

The computer 102 of FIG. 1 used by a locksmith to update an MVP is similar in general architecture to the server computer described above in connection with FIG. 2.

Figure 3:
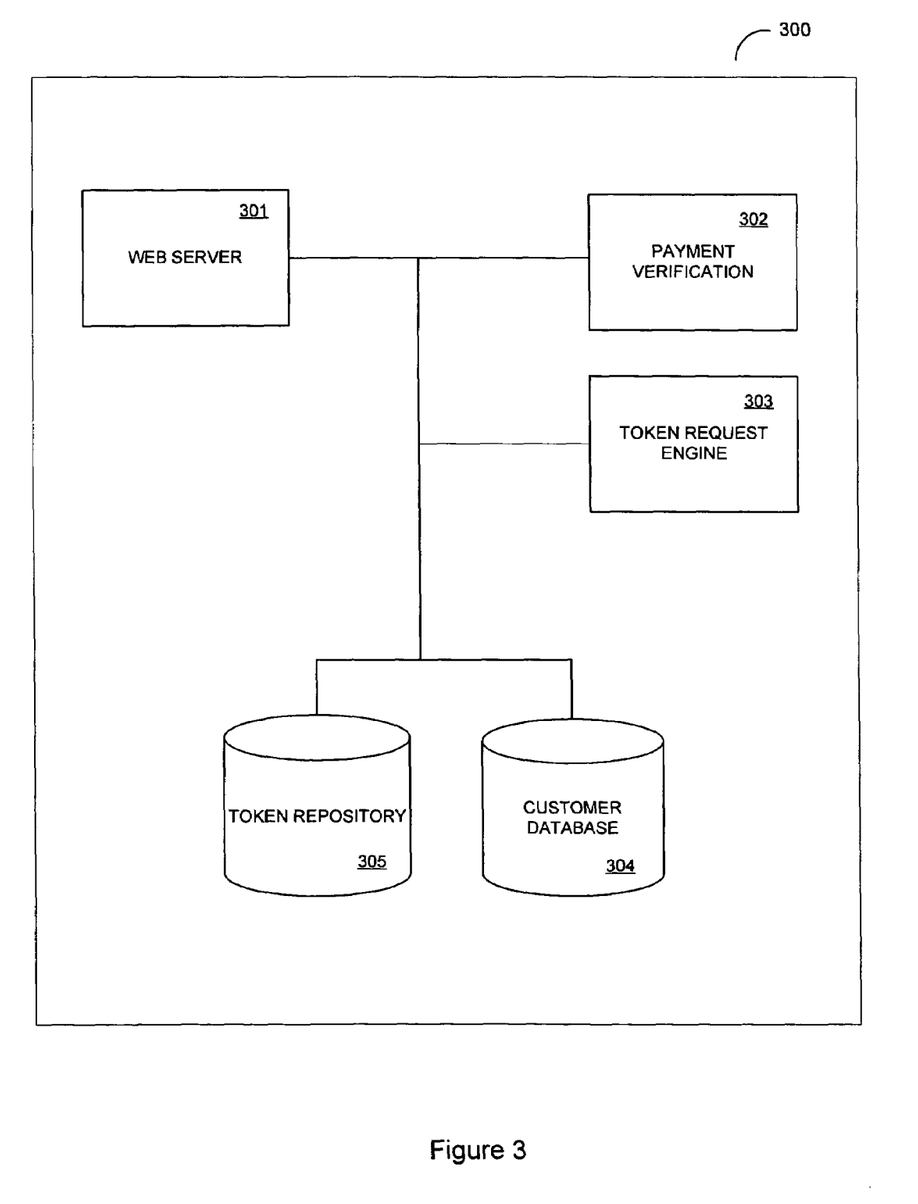
FIG. 3 is a generalized block diagram of the software components of the token server, in accordance with the present invention.

FIG. 3 is a generalized block diagram of the architecture of one example embodiment of the token dispensing system on the token server. The token server 300 includes a web server 301, a payment verification module 302, a token request engine 303, a customer database 304, a token repository 305, and a secure handshake module 306.

The web server provides a web interface to the token server such that a locksmith may use a standard browser to perform the token update.

The payment verification module verifies payment, for example by verifying credit card information to obtain authorization that the charge will go through and be honored. Other forms of authorization could include electronic check, PayPal™, or other payment systems.

The token request engine manages the handling of requests for tokens as well as downloading of tokens. The token request engine creates the token update file, described below.

The customer database includes the information on customers necessary to manage the token update system, including tokens previously paid for yet not downloaded to the MVP.

The token repository includes the tokens to be used by the MVP to program keys. In one embodiment of the invention the tokens are key values which must be authenticated prior to allowing the MVP to program a transponder key. In such an embodiment the tokes would preferably be single use electronic key values, capable of being used only once by the MVP to authorize programming a vehicle transponder key. Alternatively, the tokens could be multiple use electronic key values.

In an alternate embodiment of the present invention, tokens are a stored value, preferably an integer value representing the number of vehicle transponder keys the MVP may program.

While the presently preferred embodiment has the token repository as separate from the customer database, alternate embodiment could store the tokens (either as electronic key values or as integer values representing the number of automobile keys the MVP may program) in the customer database or another database.

The secure handshake module establishes authenticates the MVP and establishes a secure condition where the token count on the MVP can be increased (or decreased).

Multiple Vehicle Programmer and Token System

Figure 4:
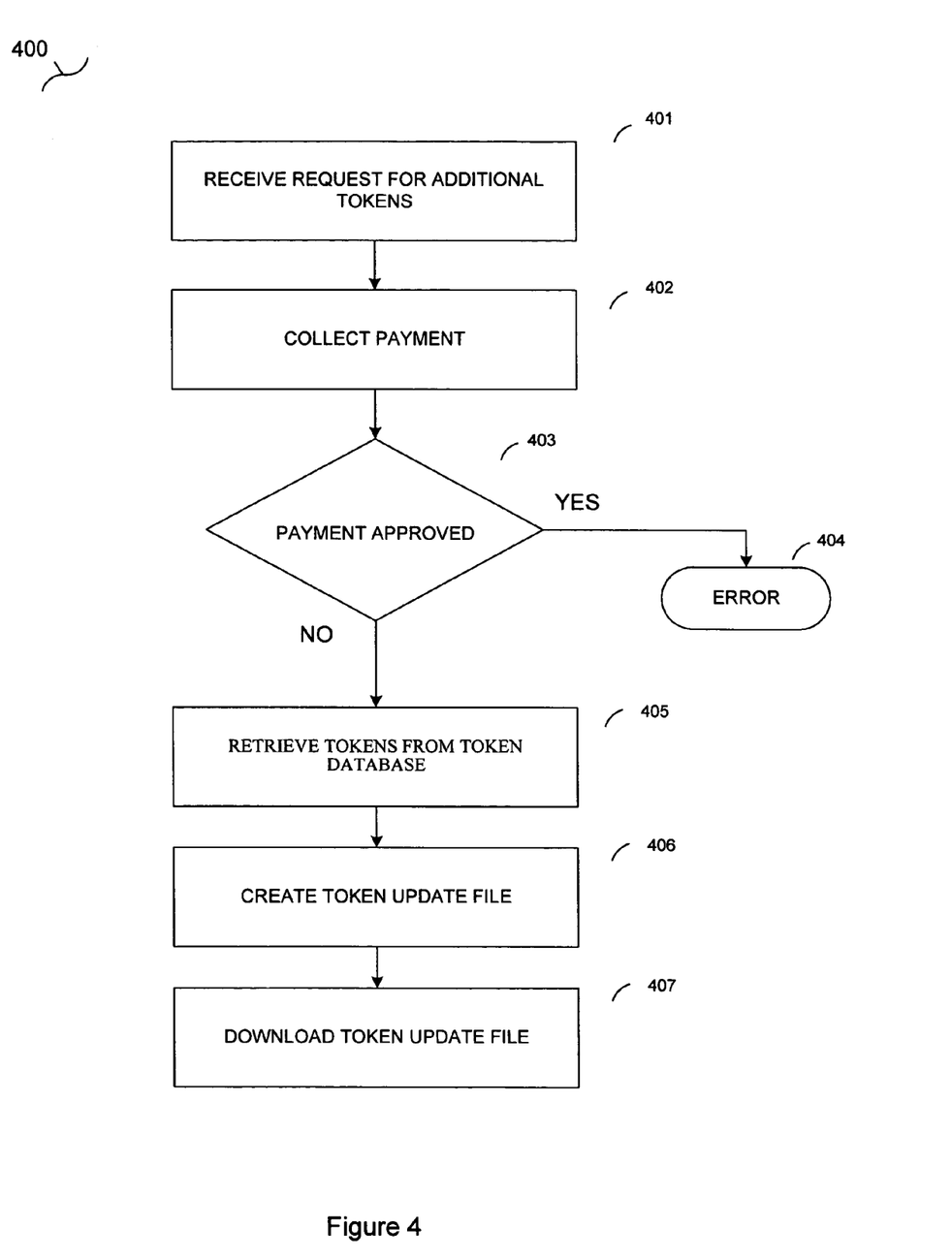
FIG. 4 is a generalized flow diagram illustrating the process of receiving tokens from the token server, in accordance with the present invention.

FIG. 4 is a generalized flow diagram illustrating the process 400 of receiving tokens from the token server. A locksmith wishing to obtain the ability to program additional keys connects his MVP to a computer, much they way he would to receive software updates for the MVP. In the presently preferred embodiment, the MVP must be connected to the computer to receive tokens from the token server. A secure connection between the MVP and the token server is established. In the presently preferred embodiment, the locksmith opens a browser and navigates to a web site for receiving tokens (in the preferred embodiment, the locksmith must authenticate himself to access his account). The locksmith can check if there are any unused tokens in his account (tokens not yet downloaded from the token server). A locksmith could have previously purchased tokens, online or offline (for example, purchased additional tokens offline and the tokens were credited to the locksmith's account). The locksmith may also inquire about group or individual pricing of tokens, check for updates to software, etc. at the web site. In the presently preferred embodiment, the locksmith has the option of purchasing additional tokens online. Alternate embodiments of the present invention could only provide offline purchasing of tokens.

At step 401 the token server receives the request to purchase additional tokens to allow programming additional keys. At step 402 the token server collects payment and identifying information. Payment can be in the form of credit card information, PayPal™ information, electronic funds transfer, information identifying prior payment, or any other form of transferring payment.

After collecting payment information at step 402, the system proceeds to step 403 where a determination is made whether the payment has been properly authorized or received. If payment was denied or not approved at step 403 the system proceeds to step 404 where an error is returned. The system could make an additional request to re-enter payment information, enter alternate payment information, or other instructions. If the payment was approved at step 403 the system proceeds to step 405.

If payment has been approved at step 403, or if the locksmith has unused tokens in their account, at step 405 the system retrieves the tokens from the token database. The number of tokens retrieved corresponds to the number of tokens purchased and approved at steps 401 through 403 (or purchased and approved offline). Additionally, at step 405 the system updates the customer database indicating the purchase of tokens and payment approval.

At step 406 the system creates a token update file, which includes the purchased tokens. Additionally, the token update file may include any updates or other information or software necessary to update the MVP to utilize the purchased tokens.

After step 406 the token update file is downloaded from the token server to the MVP at step 407.

Downloading Token Update File to Multiple Vehicle Programmer

Figure 5:
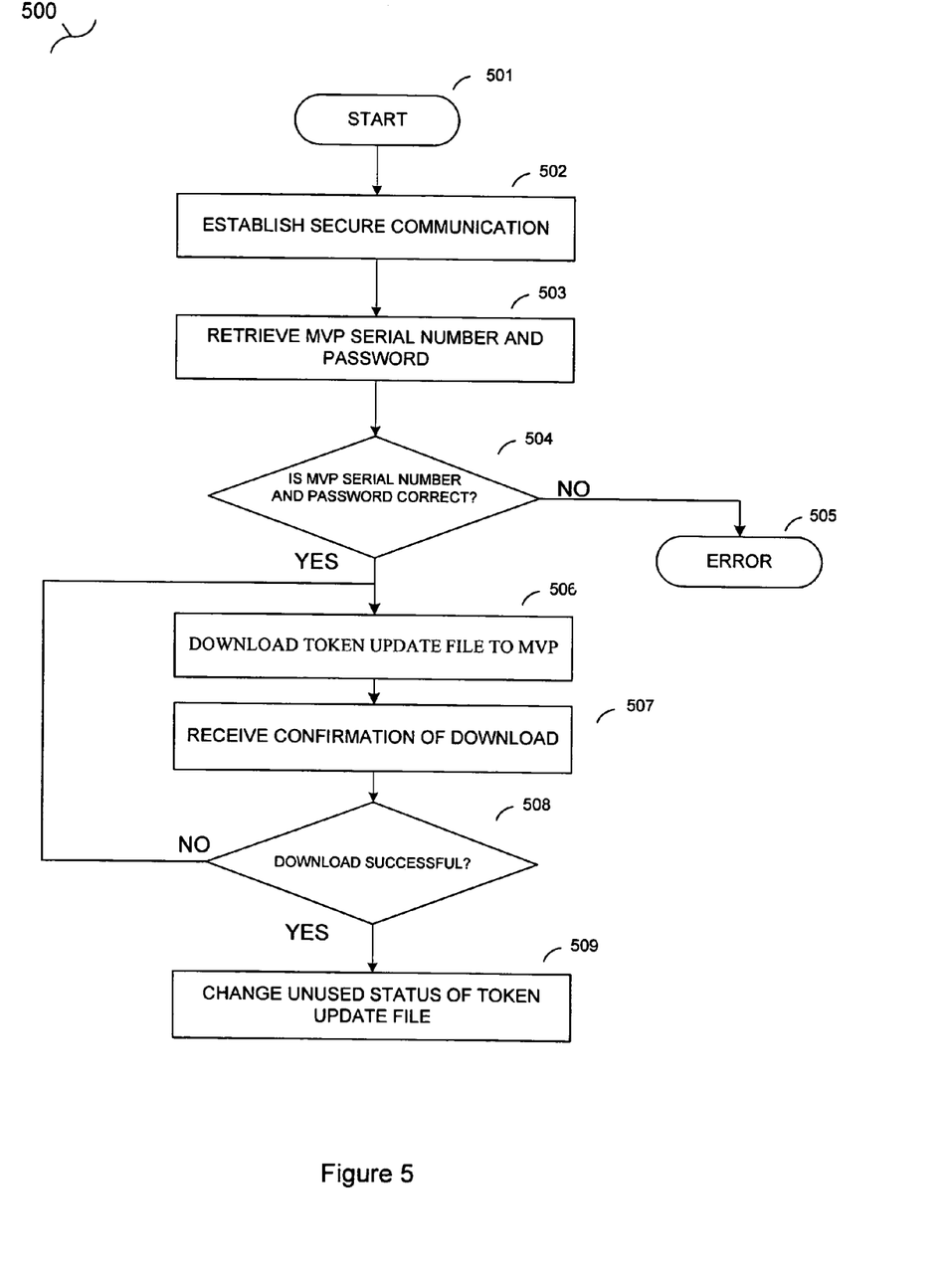
FIG. 5 is a generalized flow diagram illustrating the process of downloading tokens to an MVP, in accordance with the present invention.

FIG. 5 is a generalized flow diagram illustrating the process 500 of downloading tokens to an MVP. A locksmith wishing to add tokens to an MVP communicatively connects the MVP to the token server where the update token file is downloaded to the MVP. In the preferred embodiment, the MVP is communicatively coupled to the token server through a PC or other computer. At step 501 process 500 starts. Preferably, the locksmith initiates the token update process on the MVP. The Token server receives the request for tokens from the MVP. The request may include the serial number and password of the MVP, or the token server may request the serial number and password in response to the received token request. In the presently preferred embodiment, the locksmith must enter a password to allow the MVP to operate.

At step 504 the computer checks whether the serial number and password are correct. In the presently preferred embodiment the serial number and password are included in the token update file, ensuring that the tokens can only be used with the locksmith's MVP and not with another MVP (in the event another person is able intercept the token file or a copy is made of the token file). If at step 504 the serial number and password are not confirmed, then the computer proceeds to step 505 where an error is declared.

If at step 504 the system determines the serial number and password are correct, then the token server proceeds to step 506 where a token update file is downloaded to the MVP. After downloading the token update file, at step 507 the token server receives a confirmation from the MVP that the token update file was successfully downloaded by the MVP.

At step 508 the token server checks whether download conformation has been received from the MVP. If the download confirmation is not received from the MVP, or if the download confirmation indicates the download was not successful, the token server returns to step 506 where token update file is downloaded to the MVP.

If at step 508 the computer determines the download was successful, then the computer proceeds to step 508 where the successful download of the token update file is entered in the customer database of the token server. In the presently preferred embodiment, once the customer database includes an entry specifying that the purchased tokens have been successfully downloaded, the token server will not allow that MVP to download additional tokens until the locksmith purchases additional tokens, which can then subsequently be downloaded according to process 500.

While the presently preferred embodiment includes the password and serial number of the intended MVP in the token update file, alternate embodiments could have the confirming serial number and password stored elsewhere to authenticate the MVP.

Multiple Vehicle Programmer Token Update

Figure 6:
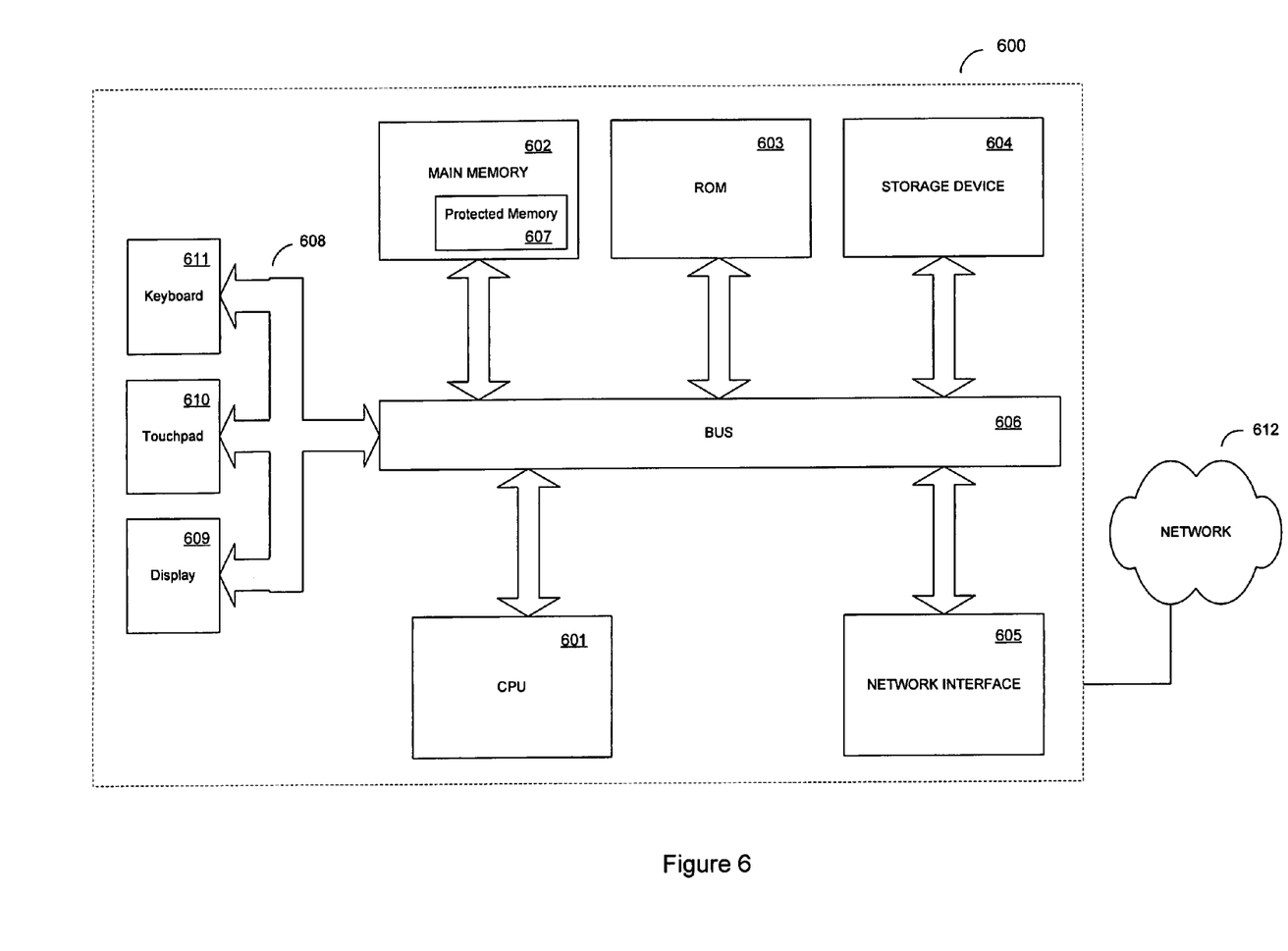
FIG. 6 is a generalized block diagram of a multiple vehicle programmer that may be used to implement the present invention.

FIG. 6 is a generalized block diagram of an MVP 600 including a central processing unit (CPU) 601, main memory (typically RAM) 602, read-only memory (ROM) 603, a storage device (typically either flash memory or other non volatile memory) 604, and a network device (typically a network interface card, a.k.a. NIC) 605. Within main memory 604 is a secure memory 607 which is protected from tampering without the permission of the token server. The network device 605 connects the server computer to a communications network 612.

The MVP includes a bus 606 or other communication mechanism for communicating information between the CPU 601 and other components of the MVP coupled with bus 606. The CPU 601 is used for processing instructions and data. The main memory 602, ROM 603 and storage device 604 are coupled to bus 606 and store information and instructions to be executed by processor 601. Main memory 602 also may be used for storing temporary variables or other intermediate information during execution of instructions to be executed by processor 601.

MVP 600 includes a display 609, such as a flat panel display or LED (light emitting diode) display, for displaying information to a user of the MVP. The MVP includes an input device 610, such as a keyboard, is coupled to bus 608 for entering information and instructions to the server 600. The keyboard 610 can be either an alphanumeric pad, a complete keyboard, or any combination of special purpose and general keys. Additionally, a user input device 611 such as touchpad, a trackball, cursor direction keys, or the like for communicating direction information and command selections to the processor 601 and for controlling cursor movement on the display 609 may be used with the MVP 600.

The MVP 600 is designed to run programs implementing methods, such as the methods of the present invention. Typically such programs are stored in the storage device of the MVP, and instructions and data of the program are loaded into the RAM during operation of the program. Alternate embodiments of the present invention could have the program loaded into ROM memory, loaded exclusively into RAM memory, or could be hard wired as part of the design of the server. Accordingly, programs implementing the methods of the present invention could be stored on any computer readable medium coupled to the MVP. The present invention is not limited to any specific combination of hardware circuitry and software, and embodiments of the present invention may be implemented on many different combinations of hardware and software.

Figure 7:
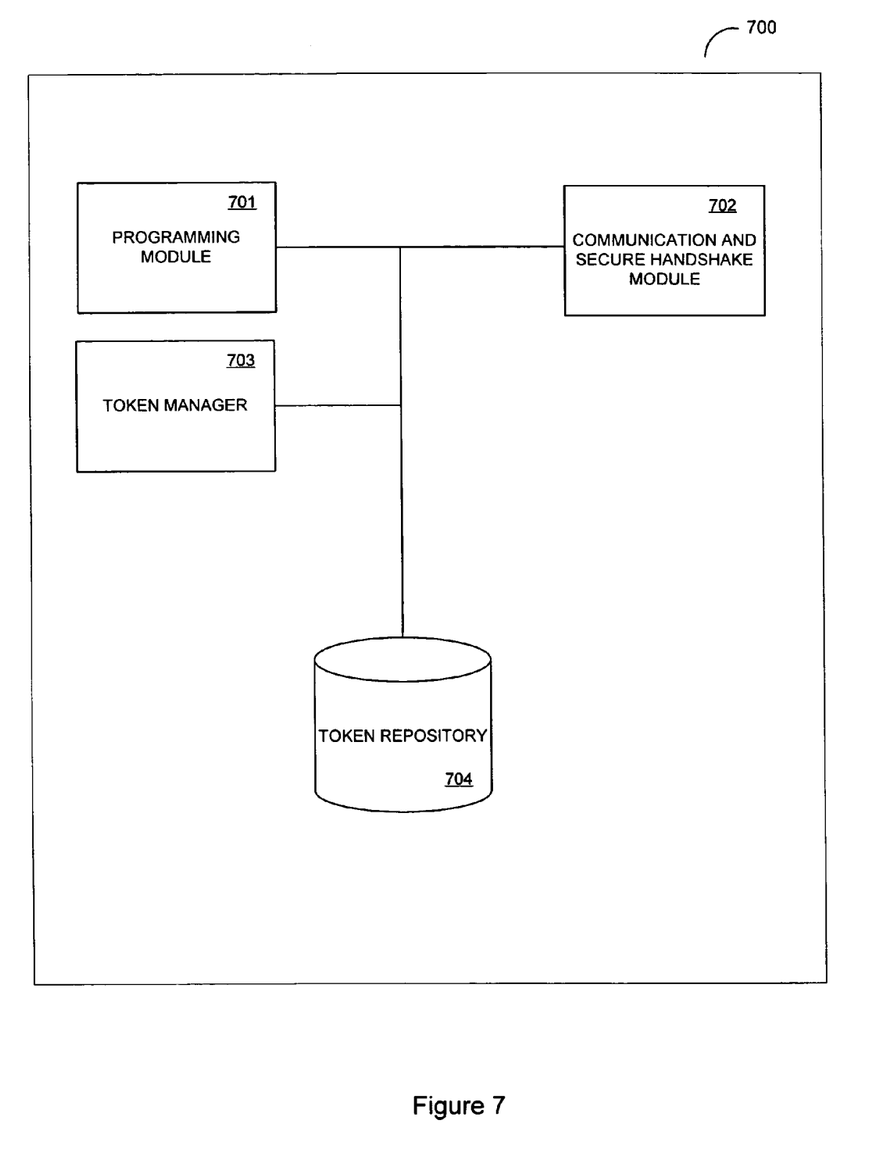
FIG. 7 is a generalized block diagram of the software components of the multiple vehicle programmer, in accordance with the present invention

FIG. 7 is a generalized block diagram of the architecture of the token system on the MVP. A programming module 701 handles the typical functions of an MVP such as programming keys, reading and changing values from the vehicle's computer, receiving and sending information and/or software with a PC, displaying information on the MVP display, receiving information from the MVP keyboard and/or touchpad, and changing and storing values in the memory or storage device of the MVP.

The communication and handshake module 702 allows the MVP to connect to an external computer to receive software and information updates, request token updates, and receive token updates. Additionally, the communication and handshake module allows the MVP to establish a secure communication between the MVP and an external computer, preferably the token server through a PC, to allow the tokens to be securely downloaded to the MVP.

A token repository 704 stores tokens for future use.

A token manager 703 interacts with the token repository and the programming module to retrieve tokens, approve the programming of keys based upon the availability of an unused token, and reduces the token count based upon the programming of a key. The token manager removes the tokens from the update file and loads the tokens in the token repository.

Figure 8:
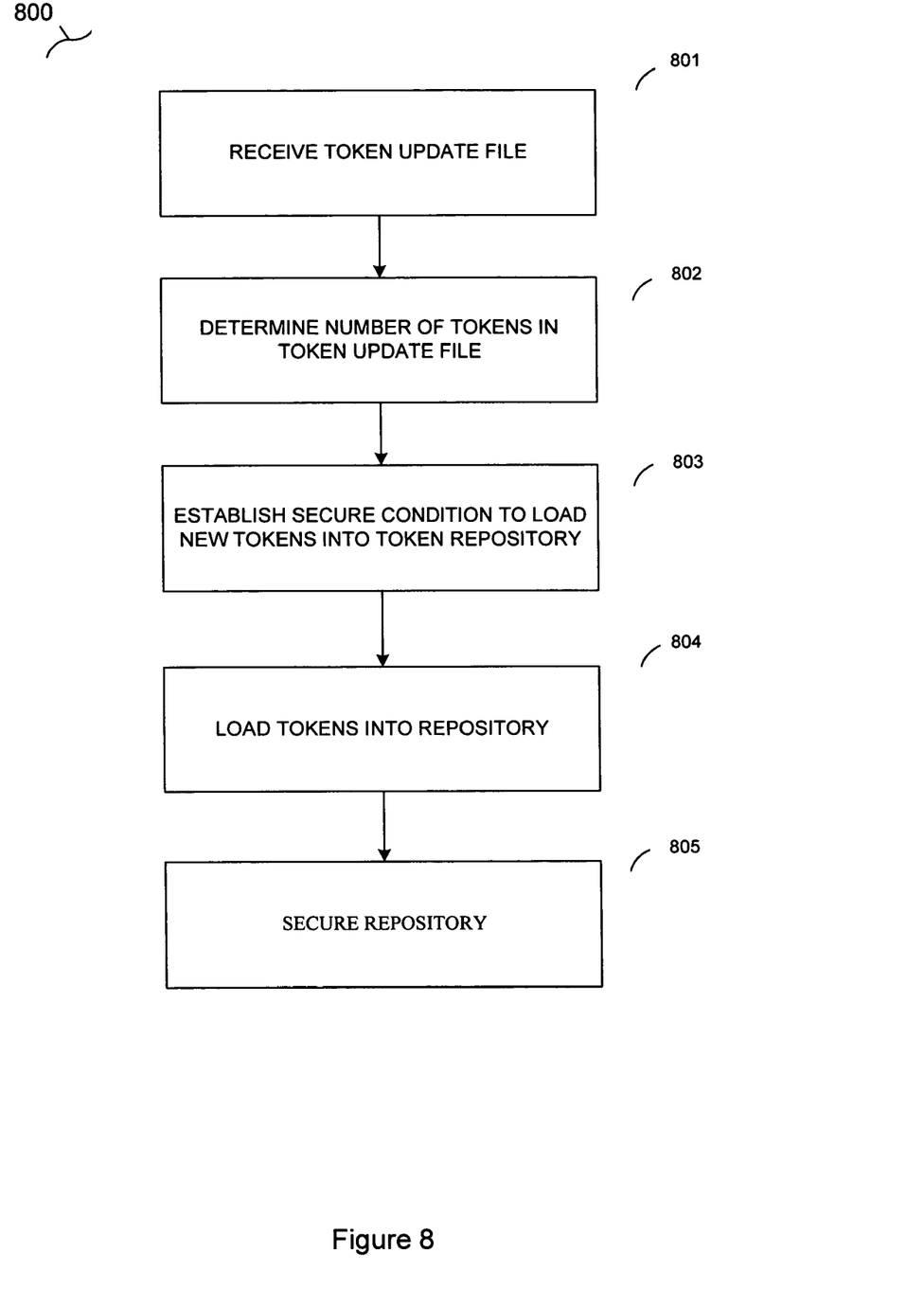
FIG. 8 is a generalized flow diagram illustrating the process of updating the token repository on an MVP, in accordance with the present invention.

FIG. 8 is a generalized flow diagram illustrating the process 800 of updating the token repository on an MVP. At step 801 the token update file is received. At step 802 the token manager determines how many tokens are in the token update file. At step 803 the token manager establishes a secure condition for tokens to be loaded into the protected memory of the MVP. Depending upon the form and protocol of the protected memory, the token manager provides the proper signal to allow tokens to be stored in the protected memory. At step 804 the token manager loads the tokens into the token repository, and increments the total token count. The total token count is the total number of unused tokens in the token repository. After the tokens have successfully been stored in the token repository, at step 805 the token manger secures the token repository in the protected memory, to prevent unauthorized tampering with the tokens. Step 805 secures the protected memory to prevent additional unauthorized tokens to be put into the token repository.

In the presently preferred embodiment, the process of adding the new tokens to the token repository and incrementing the token count may only be performed while the secure handshake connection with the token server is maintained. Alternate embodiments could allow the token repository update process to occur after the secure communication with the token server is terminated.

In the presently preferred embodiment, the token manager also uses the display of the MVP to show the locksmith the total token count prior to receiving the token update file, the number of tokens downloaded, and the total token count after the new tokens have been added to the repository. In embodiments where a token allows more than one key to be programmed, the MVP could also display the number of programmable keys in addition to, or in place of, the token counts. In the presently preferred embodiment, the incrementing of the token count is displayed on the MVP display during the process of updating the token repository, thereby allowing the locksmith to view the progress of the token update process.

Figure 9:
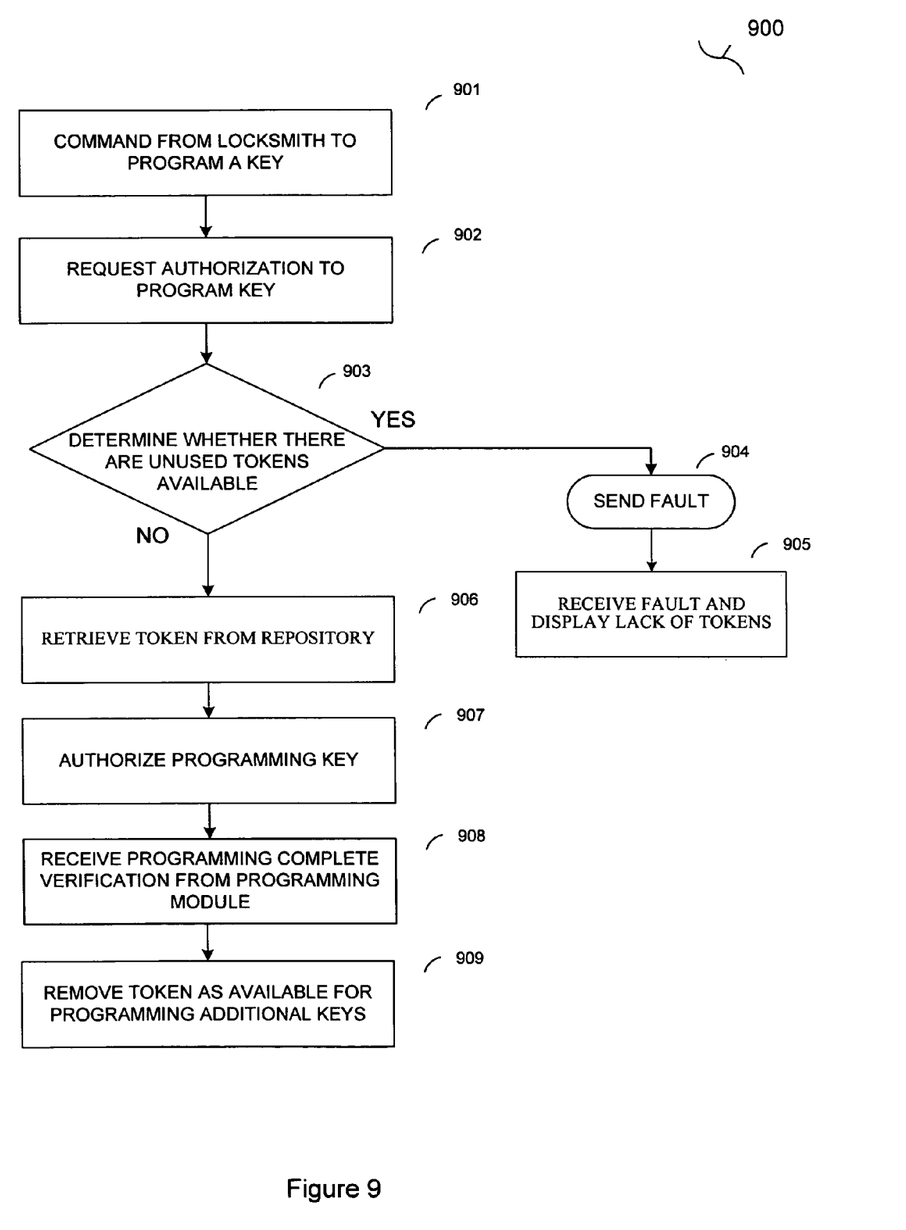
FIG. 9 is a generalized flow diagram illustrating the process of utilizing a token to authorize programming a transponder key, in accordance with the present invention.

FIG. 9 is a generalized flow diagram illustrating the process 900 of utilizing a token to authorize programming a transponder key. At step 901 the MVP receives a command from the locksmith to program a key. At step 902 the programming module sends a request to the token manager to authorize programming a key. After receiving the request, at step 903 the token manager checks the token repository to determine if there is an unused token to authorize programming a key. (In the presently preferred embodiment the token manger checks the total token count, which may or may not be stored in the token repository. Alternate embodiment of the present invention could have the token manager query the token repository to determine the number of unused tokens, rather than relying on the total token count.) If at step 903 the token manager determines there are no unused permissive tokens, then the system proceeds to step 904 and the token manager sends a fault signal to the programming module. At step 905 the programming module receives the fault signal and in response causes the display of the MVP to indicate that the key may not be programmed as there are no unused tokens. The MVP may also display an instruction to the locksmith to purchase additional tokens.

If at step 903 the token manger determines there is at least one unused token, then the system would proceed to step 906 to authorize the programming of the key.

At step 906 the token manager removes one token from the token repository and holds it in a temporary store within the protected memory of the MVP (additionally, in an alternate presently preferred embodiment, as a precaution against loss of tokens, the token manager copies the token count to a secure area of memory, and in the event of a problems such as power loss during key programming, the token manager will restore the token count to the value copied to the secure area of memory, the secure area of memory cleared after successful programming of the vehicle's transponder key). At step 907 the token manager authorizes the programming module to program a specific number of keys. In the presently preferred embodiment, one token allows one key to be programmed. However, alternate embodiments could allow multiple keys to be programmed with one token. If the programming of the key does not work on the first attempt, the program manager may try again until the key is successfully programmed. Once the programming module successfully programs the key the programming module sends a program complete signal to the token manager at step 908. Once the token manager receives the programming complete signal, at step 909 the token manager removes the token held in the temporary store from as an available token for future use in authorizing the programming of keys. In the presently preferred embodiment, the token in the temporary store is deleted from the memory of the MVP. Alternate embodiments could have the token marked as used, or a record could be kept of which tokens are used, thereby preventing its re-use. Additionally, the order of the steps of deleting the token, for example prior to, after, and during the programming of the vehicle's transponder key, could be varied in different embodiments of the invention depending on the level of security and fault tolerance desired. While the presently preferred embodiment only allows the programming of one transponder key per token, alternate embodiments could allow two, three, or any number of transponder keys to be programmed per token.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of authorizing the programming of keys in a multiple vehicle programming device, comprising:
   receiving at least one permissive token;
   storing the received permissive token in a token repository on the multiple vehicle programming device;
   receiving a request to program a key,
   requesting authorization to program a key in response to the received request;
   determining whether there is at least one unused permissive token in the token repository; and
   in the event there is at least one unused token in the token repository, authorizing the programming of a key.

2. The method of claim 1, wherein the authorization to program a key is limited to the programming of one key.

3. The method of claim 1, further comprising deleting one permissive token after programming a key.

4. The method of claim 3, wherein the deleting is performed after receiving confirmation that the key was successfully programmed.

5. The method of claim 1, wherein the key is a transponder key for an automobile.

6. The method of claim 1, wherein the key is a key fob for an automobile.

7. The method of claim 1, wherein the permissive token is an electronic key value, the electronic key value subject to authentication prior to granting authorization to program a key.

8. The method of claim 1, wherein the permissive token is a single use token.

9. The method of claim 1, wherein the permissive token is an integer value representing the number of keys which may be authorized for programming.

10. A token server for dispensing permissive tokens, the permissive tokens corresponding to the programming of vehicle transponder keys, comprising:
    a customer database for storing customer information, the customer information including an account representing the number of permissive tokens the accountholder is allowed to receive from the token server;
    a token request engine, the token request engine responding to requests for tokens from the token server, the token server authenticating an accountholder prior to receiving tokens from the token server.

11. The token server of claim 10, wherein the request for tokens comes from an MVP, the MVP authenticated prior to receiving tokens from the token server.

12. The token server of claim 10, wherein the permissive token is an electronic key value, the electronic key value subject to authentication prior to granting authorization to program a key.

13. The token server of claim 10, wherein the permissive token is a single use token.

14. The token server of claim 10, wherein the permissive token is an integer value representing the number of keys which may be authorized for programming.

15. The token server of claim 10, further comprising:
    a payment verification system, the payment verification system receiving customer payment information, verifying customer payment information, and crediting the account of an authorized customer to receive tokens.

16. A multiple vehicle programmer for programming vehicle keys, the multiple vehicle programmer comprising:
    a central processing unit for processing instructions;
    an interface for communicatively coupling with a vehicle key;
    a memory for storing information and instructions used by the central processing unit, the memory carrying one or more sequences of instructions which, when executed by the central processing unit, cause the central processing unit to perform the steps of:
    receiving at least one permissive token;
    storing the received permissive token in a token repository on the multiple vehicle programming device;
    receiving a request to program a key,
    requesting authorization to program a key in response to the received request;

determining whether there is at least one unused permissive token in the token repository; and in the event there is at least one unused token in the token repository, authorizing the programming of a key.

17. The multiple vehicle programmer of claim 16, wherein the key is a transponder key for an automobile.

18. The multiple vehicle programmer of claim 16, wherein the permissive token is an integer value representing the number of keys which may be authorized for programming.

19. The multiple vehicle programmer of claim 16, further comprising deleting one permissive token after programming a key.

20. A computer-readable medium carrying one or more sequences of instructions for authorizing the programming of a vehicle key using permissive tokens, wherein execution of the one or more sequences of instructions by one or more processors causes the one or more processors to perform the steps of:

receiving at least one permissive token;

storing the received permissive token in a token repository requesting authorization to program a key;

determining whether there is at least one unused permissive token in the token repository; and in the event there is at least one unused token in the token repository, authorizing the programming of a key.

\* \* \* \* \*